US006249502B1

(12) United States Patent
Mushiake

(10) Patent No.: US 6,249,502 B1
(45) Date of Patent: Jun. 19, 2001

(54) OPTICAL RECORDING HEAD

(75) Inventor: Nobuo Mushiake, Osaka (JP)

(73) Assignee: Minolta Co., Ltd., Osaka (JP)

(*) Notice: Subject to any disclaimer, the term of this patent is extended or adjusted under 35 U.S.C. 154(b) by 0 days.

(21) Appl. No.: 09/185,650

(22) Filed: Nov. 5, 1998

(30) Foreign Application Priority Data

Nov. 7, 1997 (JP) .................................................. 9-306089
Nov. 17, 1997 (JP) .................................................. 9-315043

(51) Int. Cl.[7] .................................................. G11B 7/00
(52) U.S. Cl. .................. 369/121; 369/112.24; 369/125; 369/112.25
(58) Field of Search .................................. 369/121, 112, 369/117, 125; 359/276, 245, 249; 358/515, 503, 521

(56) References Cited

U.S. PATENT DOCUMENTS 5,247,387 * 9/1993 Matsubara et al. .................. 359/276
5,351,617 * 10/1994 Williams et al. .................... 101/467

FOREIGN PATENT DOCUMENTS 1-222978 * 9/1989 (JP) .
5-196877 * 8/1993 (JP) .
6-347925 12/1994 (JP) .
8-137030 5/1996 (JP) .
8-190024 7/1996 (JP) .

* cited by examiner

*Primary Examiner*—Thang V. Tran
*Assistant Examiner*—Kim-Kwok Chu
(74) *Attorney, Agent, or Firm*—McDermott, Will & Emery

(57) ABSTRACT

An optical recording head which decomposes light emitted from a light source into three primary colors with rotation of a color wheel, emits the light linearly through an optical fiber array, illuminates an optical valve array through an integrator and an illuminating optical element array and exposes a photographic paper to light modulated by the optical valve array through an imaging optical element array. The integrator is formed by arranging two mirrors in parallel to each other, and a rod lens is provided between the mirrors. The rod lens has a refracting power to decrease the divergent angle of the light emergent from the optical fiber array.

19 Claims, 5 Drawing Sheets

OPTICAL RECORDING HEAD

This application is based on application Nos. 9-306089 and 9-315043 filed in Japan, the contents of which are hereby incorporated by reference.

BACKGROUND OF THE INVENTION

1. Field of the Invention

The present invention relates to an optical recording head, and more particularly to an optical recording head which has an optical valve element array made of PLZT, LC or the like or a self-emitting element array composed of LEDs and records an image (latent image) on a recording medium such as a photosensitive material and an electrophotographic photoreceptor.

2. Description of Prior Art

As a device for drawing an image (latent image) on a photographic paper or film made of a silver-halide sensitive material or an electrophotographic photoreceptor, an optical recording device which comprises a plurality of optical valve elements using PLZT arranged in a line and controls the optical valve elements to be on or off individually is generally known.

In this type of optical recording device, a two-dimensional image is drawn on a photosensitive material by projecting light, which passed through a plurality of optical valve elements arranged in a line (in a main-scanning direction), onto the photosensitive material and moving the photosensitive material in a sub-scanning direction. In the optical recording device, a great exposure is an indispensable condition for achieving high-speed drawing.

In order to satisfy the condition, the present inventor aimed at providing an integrator on the light emitting side of an optical fiber array for converting light from a light source into a line of light. The area of the light emitting end face of the integrator is made equal to the cross sectional area of the optical fiber array.

As for drawing of a color image using a color photographic paper, there is a known method in which lights of three primary colors are successively projected while switching colors by means of, for example, a color wheel located between a light source and an optical fiber array. The color wheel has R, G, B filters placed at equal intervals around its rotation axis, and is driven to rotate so that switching of the R, G, B filters is executed in synchronization with drawing of one line of each of the three primary colors. The diameter of such a color wheel is substantially proportional to the area of the light incident end face of the optical fiber array.

By the way, as the speed of drawing increases, the cycle of switching the R, G, B filters becomes shorter. This means that the rotation speed of the color wheel needs to be increased. In general, in order to rotate the wheel at a high speed, it is advantageous to decrease the diameter of the wheel. This means that the area of the light incident end face of the optical fiber array becomes smaller, and the illuminating area on the optical valve elements is in turn reduced, due to the above-mentioned proportional relationship. Consequently, higher accuracy is required in positioning the optical valve elements. However, the positioning accuracy requirement can be eased by setting the cross sectional area of the integrator to be greater than the area of the light emitting end face of the optical fiber array. In this case, however, the exposure on the photosensitive material is lowered, and the primary object, namely high-speed drawing, can not be achieved.

Meanwhile, in order to draw a color image at a high speed, Japanese Laid-Open Publication No. 6-347925 proposes a printer provided with three optical recording heads. In such a printer, the three optical recording heads are arranged in a sub-scanning direction, and a so-called tandem system in which an image is composed/recorded by exposing a recording medium (photographic paper) transported in a plane direction successively with an introduction of a predetermined time lag. When exposure is performed by a single head while successively switching the three primary colors B, G, R, the exposure of each color with respect to each pixel is inevitably reduced to one third because of switching. The structure using three heads does not cause such a reduction in exposure, thereby achieving high-speed drawing.

However, with the tandem system, it is difficult to accurately transport the photographic paper in a plane direction through a region where the three recording heads are arranged. More specifically, the exposure points of the B, G, R lights on the recording medium do not coincide with each other due to variations in transport speed of the photographic paper, a zigzag movement of the photographic paper or stretching of the photographic paper itself, resulting in color deviation or running. Moreover, in order to provide images of high quality with this kind of optical recording device, it is preferred to measure the quantity of light of each optical valve element and adjust the quantity of light according to the measured value. However, in the three-head structure of the tandem system, since three calibrators are required, the cost is increased.

SUMMARY OF THE INVENTION

An object of the present invention is to provide an optical recording head which efficiently transmits light to increase the exposure and is suited for high-speed drawing of a color image and a light source device for such an optical recording head.

Another object of the present invention is to provide an optical recording device capable of composing/recording an image accurately on a recording medium by using a plurality of optical recording heads, without requiring more than one calibrator.

In order to achieve the above objects, an optical recording head according to the present invention comprises a light source, an optical fiber array, an integrator, a first optical element disposed in the light incident end section of the integrator, an optical valve array and a second optical element array.

In the optical recording head, light from the light source is emitted linearly through the optical fiber array, and unevenness in distribution of an intensity of the light is reduced by the integrator. Then, the lights are incident to the optical valve array. The first optical element disposed in the light incident end section of the integrator has a function of decreasing the divergent angle $\theta_1$ of light emergent from the optical fiber array, so that the light is emergent from the integrator at a divergent angle $\theta_1'$ smaller than the divergent angle $\theta_1$. The optical valve array modulates light by switching each optical valve element between on and off according to image information. The modulated light is focused on a photosensitive material by the second optical element.

Thus, according to the present invention, since the first optical element disposed in the light incident section of the integrator reduces the divergent angle of light emergent from the optical fiber array, divergence of light emergent from the integrator can be suppressed, and the light can be efficiently used to illuminate the optical valve elements. Therefore, even when the intensity of light emitted from the optical fiber array is small, it is possible to prevent lowering of the exposure on the photosensitive material and deterioration of performance of high-speed drawing. Besides, there is no need to decrease the cross sectional area of the integrator according to the cross sectional area of the optical fiber array, thereby ensuring the freedom in designing the optical valve array, etc.

Moreover, in the optical recording head of the present invention, it is preferred to compose the integrator of two mirrors arranged in parallel to each other, use a rod lens as the first optical element and sandwich the rod lens between the two mirrors. By placing the rod lens between the two mirrors, it is possible to maintain the interval of the two mirrors accurately.

Furthermore, an optical recording device according to the present invention comprises: a plurality of optical recording heads for switching on and off a number of optical elements arranged in a main scanning direction according to image data; relay-use imaging optical element arrays disposed in light emitting sections of the respective optical recording heads; a light combining member for superimposing lights emergent from the relay-use imaging optical element arrays so that the lights travel in a direction; and an imaging optical element array for focusing the lights emergent from the light combining member on one line.

In the optical recording device, lights modulated by the plurality of optical recording heads are incident to the light combining member through the relay-use imaging optical element array. In the light combining member, the lights are superimposed so that the lights travel in a direction. Furthermore, by moving a recording medium in a sub-scanning direction over the imaging position on which the lights are focused by the imaging optical element array, a two-dimensional image (latent image) is recorded on the recording medium.

Thus, according to the present invention, relay-use imaging optical element arrays are provided for a plurality of optical recording heads, each of which has optical elements made of PLZT, LC or LED or the like, respectively, and an imaging optical element array for focusing light on the exposure position is provided in a stage after the relay-use imaging optical element arrays. With this structure, it is possible to ensure a relatively long optical path between the relay-use imaging optical element arrays and the imaging optical element array in the final stage, thereby allowing insertion of a light combining member in the optical path.

For example, if lights of the three primary colors B, G and R are focused together on one line on the recording medium moving in the sub-scanning direction by using such an optical system, it is possible to solve the problems such as color deviation and running due to variations in moving speed of the recording medium, a zigzag movement of the recording medium or stretching of the recording medium.

Moreover, in the present invention, since the lights emitted from the respective optical recording heads gather on one line, it is not necessary to provide more than one calibrator for measuring/adjusting the quantity of light of each optical element, thereby decreasing the cost.

BRIEF DESCRIPTION OF THE DRAWINGS

These and other objects and features of the present invention will be apparent from the following description with reference to the accompanying drawings, in which.

DETAILED DESCRIPTION OF THE PREFERRED EMBODIMENTS

The following description will describe embodiments of the present invention with reference to the attached drawings.

First Embodiment

Figure 1:
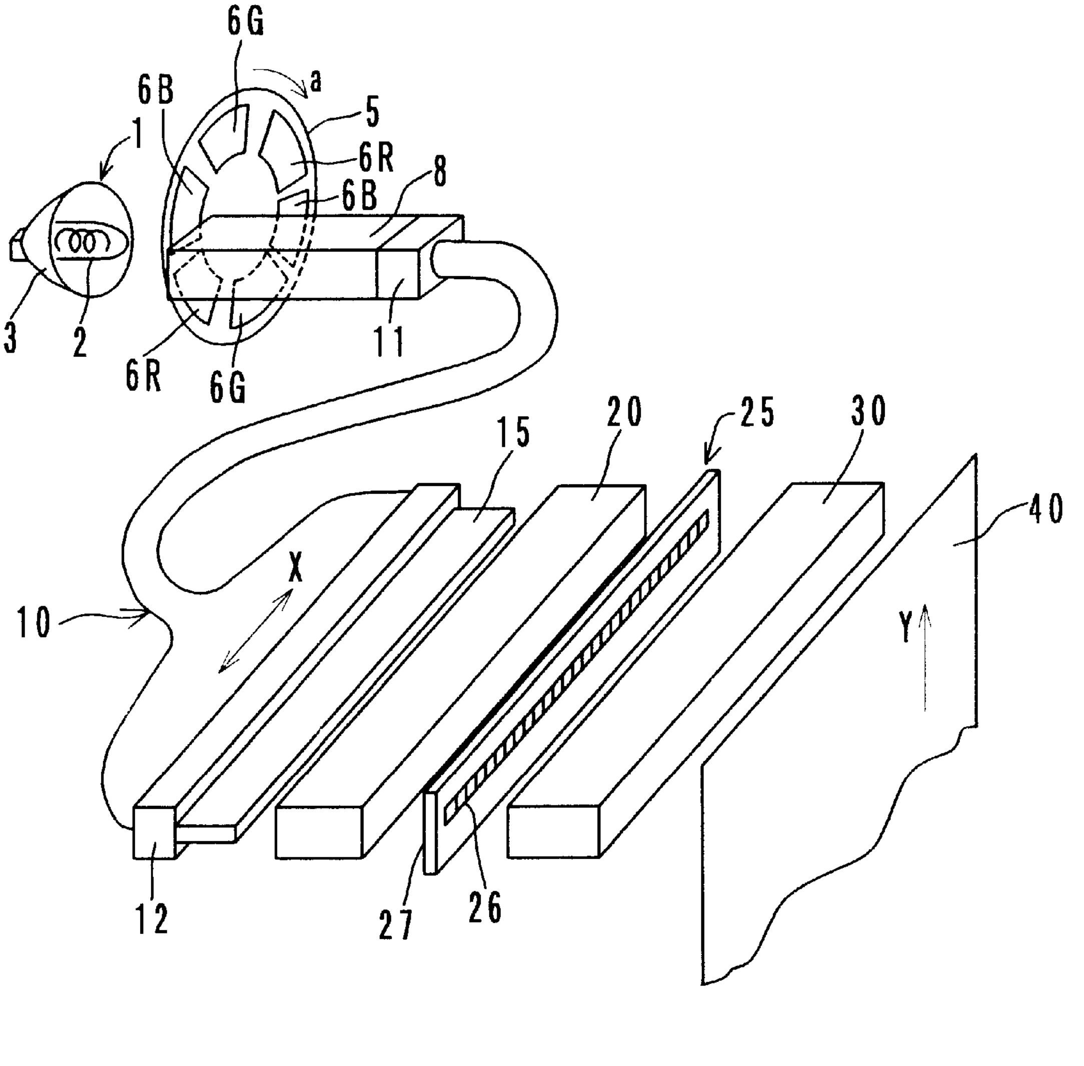
FIG. 1 is a schematic view of an optical recording head which is a first embodiment of the present invention.
Figure 2:
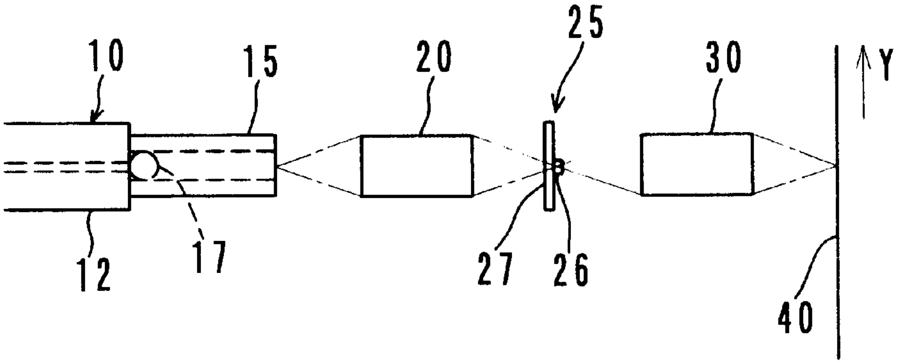
FIG. 2 is an illustration of the optical path in the optical recording head.
Figure 3:
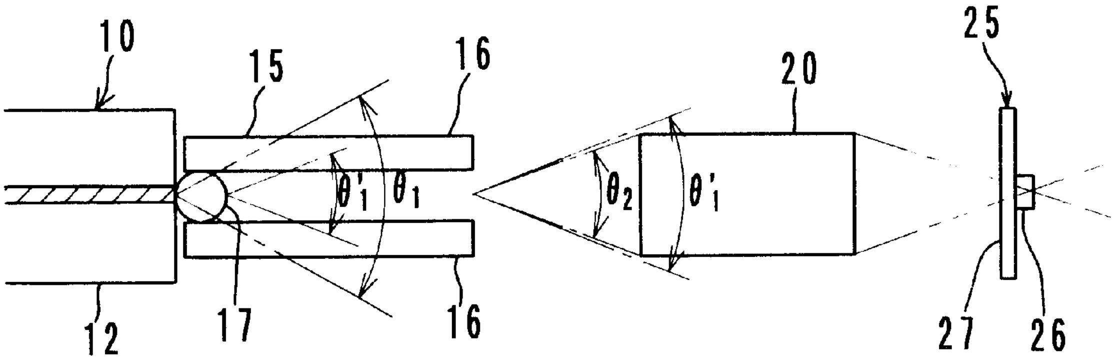
FIG. 3 is an illustration of the optical path in a main part of the optical recording head.

As illustrated in FIGS. 1, 2 and 3, an optical recording head according to the first embodiment of the present invention comprises a light source 1, a color wheel 5, a first integrator 8, an optical fiber array 10, a second integrator 15, a rod lens 17, an illuminating optical element array 20, an optical valve array 25 and an imaging optical element array 30.

The light source 1 is formed of a lamp 2 and a reflector 3. The color wheel 5 has one or more sets of filers 6R, 6G and 6B for decomposing light emitted from the light source 1 into lights of three primary colors R, G and B, and is driven to rotate at a high speed in the direction of arrow "a".

The first integrator 8 is a box that has a reflecting surface formed on the inner face thereof by, for example, aluminum deposition to function as an optical waveguide or a box that is a glass cube and uses the total reflection to function as an optical waveguide. The first integrator 8 functions to equalize the intensity of lights which passed through the respective filters 6R, 6G and 6B of the color wheel 5 on its light emitting end face.

The optical fiber array 10 is formed by binding a number of optical fibers. The light incident ends of the optical fibers are bound in a square shape and held in a holder 11, and adjoin the light emitting end face of the integrator 8. The light emitting ends of the optical fibers are arranged in a line in a main-scanning direction shown by arrow "X" and held in a holder 12. The optical fiber array 10 has a uniform cross sectional area from the light incident end face through to the light emitting end face.

The second integrator 15 functions as an optical waveguide like the first integrator 8, and is located adjacent to the light emitting end face of the optical fiber array 10. The integrator 15 is formed by arranging two mirrors 16 (see FIG. 3) in parallel to each other with a predetermined space therebetween and with their mirror faces facing each other. The rod lens 17 is made of a glass material or a resin material such as an acrylic material and has a function of refracting light. The rod lens 17 is sandwiched between the mirrors 16 in the light incident end section of the integrator 15.

Divergent light is emitted from each of the optical fibers of the optical fiber array 10. While the divergent lights emitted from the respective optical fibers are traveling in the integrator 15, unevenness in distribution of an intensity of light is reduced, and the intensity of light on the light emitting end face of the integrator 15 is even. More particularly, the differences in light quantity among the optical fibers are diminished, and uniform illuminating light is obtained on the light emitting end face of the integrator 15. When the divergent angle of the light emitted from the optical fiber array 10 is $\theta_1$, the light is emitted from the integrator 15 at a divergent angle $\theta_1'$ ($\theta_1'<\theta_1$) because of the refracting function of the rod lens 17.

The illuminating optical element array 20 is formed by arranging focusing light transmitters in a line (SELFOC lens array: trade name of Nippon Sheet Glass Co., Ltd.), and focuses the uniform high-illuminance light emitted from the integrator 15 on a predetermined position to form an image. The optical valve array 25, for example, has a plurality of optical valve elements 26 which are arranged in a line on chips made of PLZT and electrodes to which a voltage is to be applied. The optical valve elements 26 and the electrodes are mounted on a substrate 27. Additionally, a driving circuit for the optical valve elements 26, a light-incident-side polarizing plate and a light-emitting-side polarizing plate (none of them are shown) are provided.

The optical valve array 25 selectively transmits light by applying a predetermined voltage (switching on) to selected ones of the optical valve elements 26. Since the optical valve elements 26 are located at substantially the imaging position of the illuminating optical element array 20, the illuminating area is limited, thereby reducing leakage light from the optical valve elements 26. Moreover, because the illuminating light from the integrator 15 is uniform and because a beam of light is converged by the rod lens 17, a sufficient quantity of light is obtained, thereby achieving a high contrast at the time of switching on and off the optical valve elements 26.

Like the illuminating optical element array 20, the imaging optical element array 30 is formed by arranging focusing light transmitters in a line, and focuses the light which passed through the optical valve elements 26 on its focal point. A photographic paper 40 is transported in a sub-scanning direction shown by arrow "Y" over the imaging point of the imaging optical element array 30. An image (latent image) is written on the photographic paper 40 according to the switching of the optical valve elements 26 between on and off.

Here, the relationship among the cross sectional area of the optical fiber array 10 (i.e., the cross sectional area when the optical fibers are integrated), the cross sectional area of the integrator 15 and the function of the rod lens 17 will be explained.

In general, in this kind of optical recording device, the following equation (1) is established.

cross sectional area of optical fiber array=illuminated area of optical valve array (1)

Meanwhile, in order to draw a color image, it is necessary to rotate the color wheel 5 at a high speed. For example, in order to draw one inch per second with a printing density of 300 dpi, a rotational speed of 300×60=18000 rpm is required when one set of filters 6R, 6G and 6B is used. Even if two sets of filters 6R, 6G and 6B are used, the color wheel 5 needs to be rotated at a high speed of 9000 rpm.

In order to achieve such high-speed rotation, the color wheel 5 needs to have a small diameter. In this case, the area of the filters 6R, 6G, 6B is reduced, and the area of the light incident end face of the optical fiber array 10 is made inevitably smaller. As described above, the area of the light incident end face and the area of the light emitting end face of the optical fiber array 10 are equal to each other. On the other hand, the above-mentioned equation (1) can not be established for color image drawing because the illuminated area on the optical valve array 25 is given by a predetermined value that is determined by the form of the optical valve elements 26, etc.

Figure 4A:
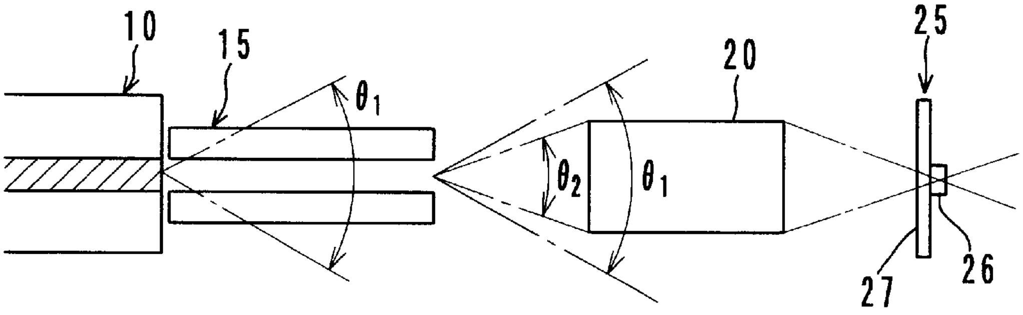
FIGS. 4*a* and 4*b* are illustrations of the optical paths in a first comparative example and in a second comparative example.

For comparison, FIG. 4*a* shows an optical system for low-speed color image drawing. The cross sectional area of the optical fiber array 10 is relatively large, and the cross sectional area of the integrator 15 is set according to the cross sectional area of the optical fiber array 10. On the other hand, in an optical system for high-speed color image drawing like the present invention, the cross sectional area of the optical fiber array 10 is small. If the cross sectional area of the integrator 15 is set according to such a small cross sectional area, the illuminated area of the optical valve array 25 becomes smaller. Consequently, it is difficult to ensure a sufficient illuminating area, and extremely high accuracy is required in positioning the optical valve array 25.

Figure 4B:
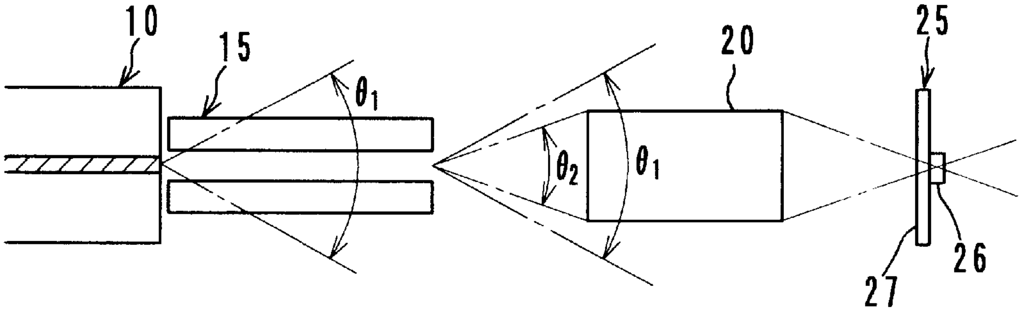

Therefore, as shown in FIG. 4*b*, the present inventors aimed at arranging the cross sectional area of the integrator 15 to be larger than the cross sectional area of the optical fiber array 10. With this arrangement, a tolerance is given for the design of the optical valve array 25. However, since the quantity of the emitted light is decreased due to the reduction in the cross sectional area of the optical fiber array 10, the quantity of light illuminating the optical valve array 25 is as a matter of course lowered and the exposure on the photographic paper 40 is in turn decreased, preventing high-speed image drawing. This explanation is made on the premise that both the low-speed color image drawing system and the high-speed color image drawing system use the same light source. In this case, the quantity of light per optical fiber is substantially the same in both the systems. However, since the total number of optical fibers is smaller in the high-speed system, the quantity of illuminating light becomes smaller in the high-speed system.

Considering the quantity of light, if the divergent angle of light emitted from the optical fiber array 10 is $\theta_1$, the divergent angle of light emitted from the integrator 15 is also $\theta_1$ (see FIGS. 4*a* and 4*b*). Assuming that an angle corresponding to the numerical aperture NA of the illuminating optical element array 20 is $\theta_2$, since $\theta_2<\theta_1$, light in the part of $\theta_1-\theta_2$ is wasted. Thus, if light that diverges at angles greater than $\theta_2$ can be also used as the illuminating light, the decrease in quantity of light due to the reduction in the cross sectional area of the optical fiber array 10 can be made up, and the lowering of the exposure on the photographic paper 40 can be prevented.

In the first embodiment, as illustrated in FIG. 3, the rod lens 17 performs refraction to decrease the divergent angle $\theta_1$ of the light emitted from the optical fiber array 10 to $\theta_1'$. Needless to say, the optimum result is obtained when the divergent angle $\theta_1'$ is substantially equal to the angle $\theta_2$ of the illuminating optical element array 20. Accordingly, in the first embodiment, waste of the light emitted from the integrator 15 can be decreased, and the efficiency of illuminating the optical valve array 25 can be improved. It is therefore possible to prevent lowering of the exposure on the photographic paper 40, thereby achieving high-speed color drawing.

Besides, in the first embodiment, the integrator 15 is formed of two mirrors 16, and the rod lens 17 is sandwiched between the mirrors 16. With this structure, it is possible to accurately keep the interval between the mirrors 16.

As the optical valve array, for example, LC can be used as well as PLZT. Additionally, it is possible to omit the illuminating optical element array 20, and even when the light emitted from the integrator 15 is made incident to the optical valve array 25 directly, the substantially same results as those explained above can be obtained.

Furthermore, another light quantity variation diminishing member can be used in place of the first integrator 8, or a heat-absorbing filter can be added. As the optical element for decreasing the divergent angle of light emitted from the optical fiber array 10, it is possible to use an optical fiber as well as the rod lens 17.

Second Embodiment

Figure 5:
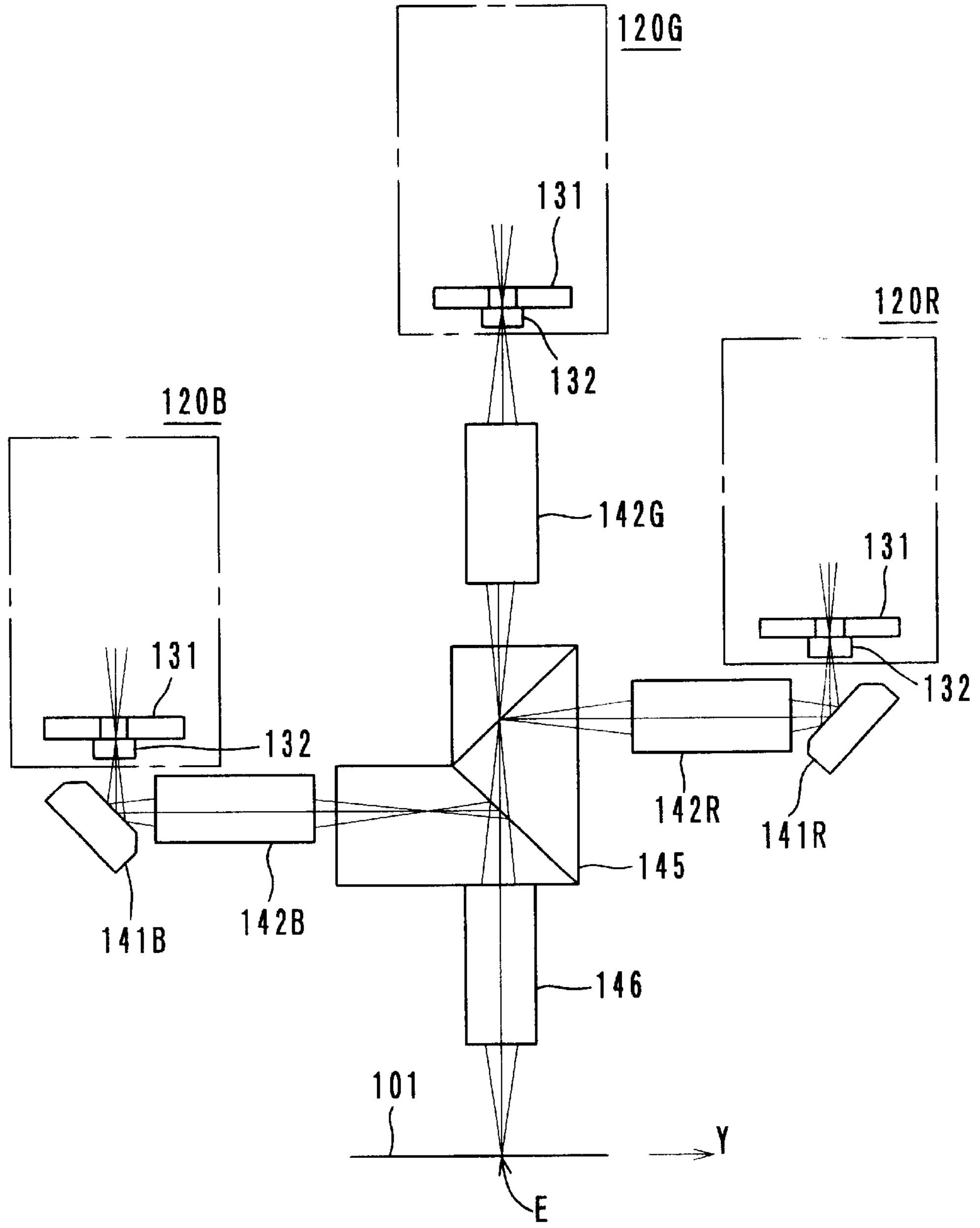
FIG. 5 is a schematic view of an optical recording device which is a second embodiment of the present invention.

FIG. 5 shows the schematic structure of an optical recording device according to the second embodiment of the present invention. This optical recording device draws a color image on a photographic paper 101 which is transported in the direction of arrow "Y" over a predetermined exposure position E, by means of three optical recording heads 120 (120B, 120G and 120R).

Figure 6:
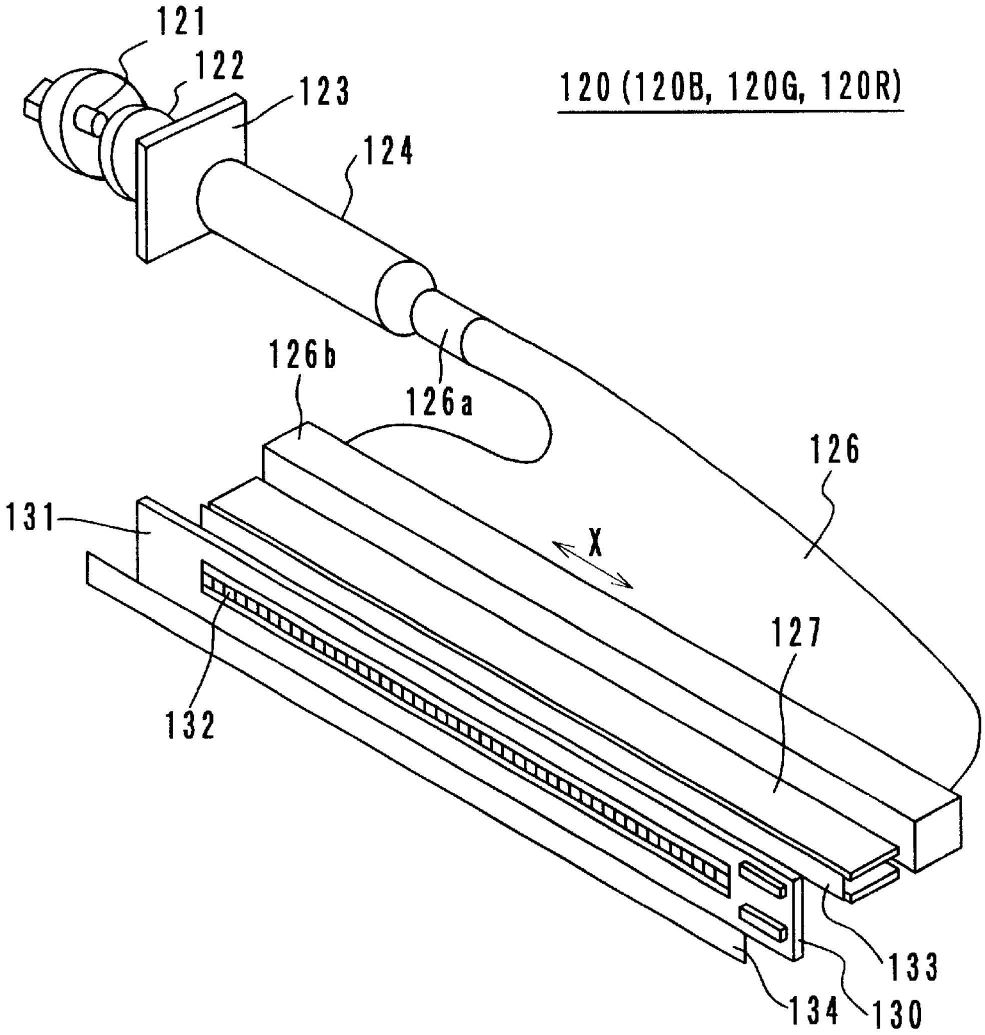
FIG. 6 is a perspective view of one of recording heads employed in the optical recording device shown by FIG. 5.

First, referring to FIG. 6, the optical recording heads 120 (120B, 120G and 120R) are described. Each of the optical recording heads 120B, 120G and 120R comprises a halogen lamp 121, a heat filter 122, a color separation filter 123, a first integrator 124, an optical fiber array 126, a second integrator 127 and an optical valve module 130.

White light emitted from the halogen lamp 121 is guided to the heat filter 122 where the heat ray is cut. Then, the light is decomposed into colors B, G and R by the color separation filter 123. The integrator 124 improves the efficiency of use of light and reduces variations in light quantity. In addition, it is preferred to provide a color correction filter, an ND filter or a mechanical shutter, etc. in the light source.

The optical fiber array 126 is formed by binding a number of optical fibers. One ends 126*a* of the optical fibers are bound and placed to face the first integrator 124. The other ends 126*b* are arranged in a main-scanning direction shown by arrow "X" so as to emit light linearly. The second integrator 127 is formed of two mirrors whose mirror surfaces are arranged to be parallel and face to each other. The second integrator 127 efficiently guides the light emitted from the optical fiber array 126 to the optical valve module 130 and has a function of reducing variations in light quantity on the light emitting end face of the optical fiber array 126.

The optical valve module 130 is formed by placing an array of optical valve chips made of PLZT on a substrate 131 (a ceramic substrate or a glass substrate provided with a slit-like opening) and arranging driver ICs by the side of the array. Optical valve elements 132 are formed on the optical valve chips, and among the optical valve elements 132, only the ones corresponding to predetermined pixels are driven by the driver ICs. In addition, a polarizer 133 and an analyzer 134 are provided in front of and behind the module 130, respectively.

As is well known, PLZT is a kind of ceramics which is light-transmitting and of a high Kerr constant and has an electro-optical effect. The polarizer 133 polarizes light linearly, and the plane of polarization of the light is rotated in an electric field generated by application of a voltage to the optical valve elements 132. Accordingly, by switching on/off the optical valve elements 132 individually, emission of light from the analyzer 134 is switched on/off pixel by pixel.

As shown in FIG. 5, the light emitted from the optical recording head 120B is reflected by a mirror 141B and transmitted through a relay-use imaging lens array 142B. The light emitted from the optical recording head 120G is transmitted through a relay-use imaging lens array 142G. Similarly, the light emitted from the optical recording head 120R is reflected by a mirror 141R and transmitted through a relay-use imaging lens array 142R.

Each of the relay-use imaging lens arrays 142B, 142G and 142R is formed by arranging focusing light transmitters (trade name: SELFOC) in a line, and a light composing prism 145 (a dichroic prism or a dichroic mirror) is provided in a position where the transmitted lights gather. The G light travels straight, and the optical paths of the B and R lights are bent at right angles so that the G, B and R lights travel in the same direction.

An imaging lens array 146 is mounted on the light emitting end face of the prism 145. Like the relay-use imaging lens arrays 142B, 142G and 142R, the imaging lens array 146 is formed by arranging focusing light transmitters in a line, and focuses the B, G, R lights united by the prism 145 on the exposure position E linearly. The photographic paper 101 is transported in a sub-scanning direction shown by arrow "Y", and an image (latent image) is recorded on the photographic paper 101 according to switching of the optical valve elements 132 between on and off.

There are a variety of lens arrays using SELFOC. As the numerical aperture NA increases, the distance between the object point and the image point becomes shorter. In an optical recording device which is required to achieve high-speed drawing, it is desirable to use a lens array having a great numerical aperture NA as an imaging system. In this case, in the optical path between the optical valve module 130 and the exposure point E, there is no sufficient space for inserting a light combining member in addition to the lens array. However, in this embodiment, the relay-use imaging lens arrays 142 (142B, 142G, 142R) are disposed right after the optical recording heads 120B, 120G and 120R, respectively, and thereafter, the imaging lens array 146 is positioned. With this structure, it is possible to ensure a relatively long optical path between the lens arrays 142 and 146, and the light combining prism 145 can be provided in the optical path.

According to the second embodiment, since the lights of the three primary colors B, G and R are united to expose one line, color deviation or running due to variations in transport speed of the photographic paper 101, a zigzag movement of the photographic paper 101 or stretching of the photographic paper 101 never occur. Needless to say, it is possible to ensure a quantity of light three times greater than that given by a structure using a single head, thereby achieving high-speed image drawing.

Moreover, in the second embodiment, in order to measure/adjust the quantity of light of the optical valve elements 132, it is only necessary to dispose one calibrator at the exposure position E. Thus, even in a structure using three heads, the number of calibrators can be reduced, thereby decreasing the cost.

Besides, the optical recording heads 120B, 120G and 120R can be so constructed that light from a single common light source is decomposed into three primary colors and branches to illuminate each optical valve module 130, instead of providing a light source (halogen lamp 121) for each head.

In addition, as the optical valve elements, LC, etc. can be used as well as PLZT. Furthermore, even when self-emitting elements such as LEDs are used, it is possible to achieve an optical recording device by a structure like the one shown in FIG. 5 without the illuminating light source section.

Although the present invention has been described in connection with the preferred embodiments above, it is to be noted that various changes and modifications are apparent to a person skilled in the art. Such changes and modifications are to be understood as being within the scope of the present invention.

What is claimed is:

1. The optical recording head comprising:

a light source;

a spectroscope which decomposes light emitted from the light source;

an optical fiber array which receives the decomposed light from the spectroscope and emits light linearly;

an integrator which transmits the light emergent from said optical fiber array while reducing unevenness in distribution of an intensity of the light;

first optical element which is disposed in a light incident end section of said integrator to reduce a divergent angle of the light emergent from said optical fiber array;

an optical value array which modulates the light emergent from said integrator; and a second optical element which focuses the light emergent from said optical value array on a recording surface.

2. The optical recording head as claimed in claim 1, wherein the spectroscope is provided between said light source and said optical fiber array and emits only light in a band of specified wavelength.

3. The optical recording head as claimed in claim 2, wherein the spectroscope is a color wheel which decomposes the light emitted from the light source into lights of three primary colors and transmits the lights one after another while rotating.

4. The optical recording head as claimed in claim 1, wherein said integrator comprises two mirrors arranged in parallel to each other.

5. The optical recording head as claimed in claim 1, wherein said first optical element is a rod lens.

6. The optical recording head as claimed in claim 1, wherein:

said integrator comprises two mirrors arranged in parallel to each other; and said first optical element is a rod lens disposed between the two mirrors.

7. The optical recording head as claimed in claim 1, wherein the recording surface is movable in a direction perpendicular to the line of light formed by the optical fiber array so as to achieve sub-scanning.

8. The optical recording head as claimed in claim 1, further comprising a second integrator between said spectroscope and said optical fiber array.

9. The optical recording head as claimed in claim 8, wherein said second integrator is an optical waveguide which transmits light using total reflection of its inner surfaces.

10. The optical recording head as claimed in claim 1, wherein said second optical element comprises focusing light transmitters arranged in a line.

11. The optical recording head as claimed in claim 1, further comprising a third optical element which is disposed between said integrator and said optical valve array to illuminate said optical valve array.

12. The optical recording head as claimed in claim 11, wherein said third optical element comprises focusing light transmitters arranged in a line.

13. The optical recording head as claimed in claim 1, wherein said optical valve array comprises PLZT elements arranged in a line between two polarizers.

14. The optical recording head as claimed in claim 1, wherein said optical valve array comprises light-transmitting liquid crystal elements arranged in a line.

15. A light source device for an optical recording head, said light source device comprising:

a light source;

a spectroscope which decomposes light emitted from the light source and emits light in a band of a specified wavelength;

an optical fiber array which receives the light from the spectroscope and emits the light linearly;

an integrator which transmits the light emergent from said optical fiber array while reducing unevenness in distribution of an intensity of the light; and an optical element which is disposed in a light incident end section of said integrator to reduce a divergent angle of the light emergent from said optical fiber array.

16. The light source device as claimed in claim 15, wherein said spectroscope is a color wheel which decomposes light emitted from the light source into lights of three primary colors and transmits the lights one after another while rotating.

17. The light source device as claimed in claim 15, wherein said integrator comprises two mirrors arranged in parallel to each other.

18. The light source device as claimed in claim 15, wherein said optical element is a rod lens.

19. The light source device as claimed in claim 15, wherein:

said integrator comprises two mirrors arranged in parallel to each other; and said optical element is a rod lens disposed between the two mirrors.

* * * * *